Dec. 27, 1949  T. M. LINVILLE ET AL  2,492,753
VENTILATION ARRANGEMENT FOR DIRECT CURRENT MACHINES
Filed July 11, 1947
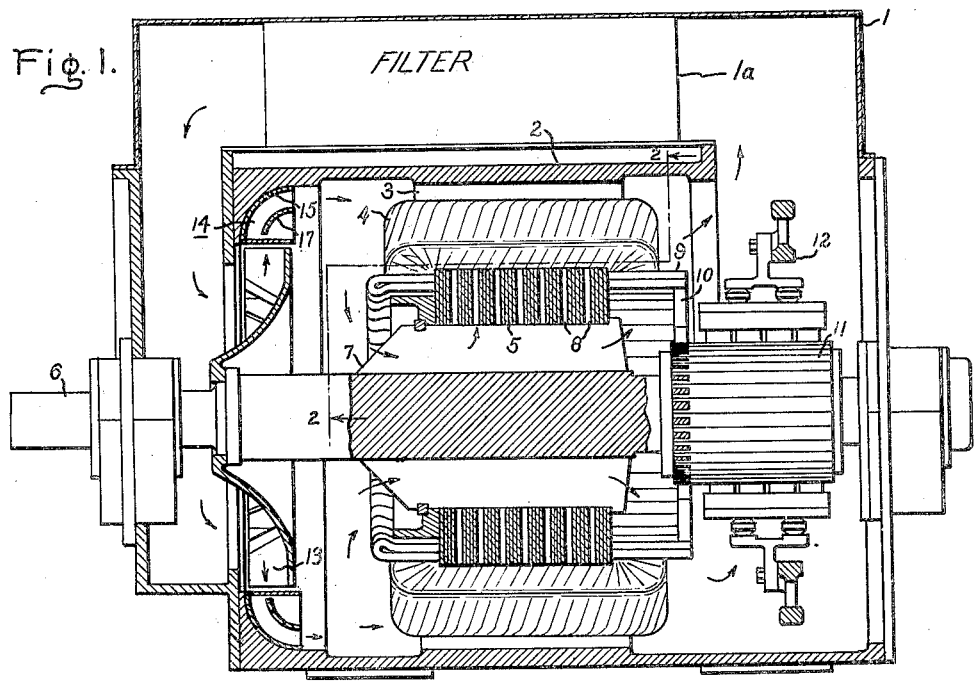
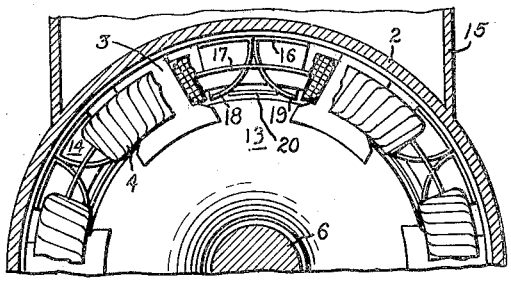
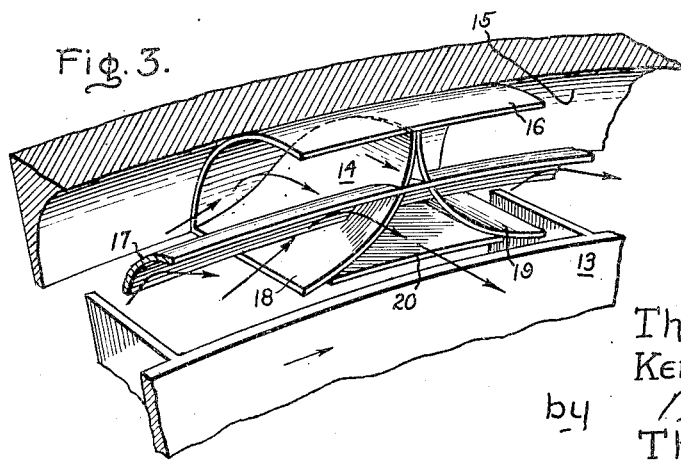
Inventors:
Thomas M. Linville,
Kenton D. McMahan,
by Purcell S. Mack
Their Attorney.

Patented Dec. 27, 1949

2,492,753

UNITED STATES PATENT OFFICE 2,492,753

VENTILATION ARRANGEMENT FOR DIRECT-CURRENT MACHINES

Thomas M. Linville and Kenton D. McMahan, Schenectady, N. Y., assignors to General Electric Company, a corporation of New York Application July 11, 1947, Serial No. 760,436

4 Claims. (Cl. 171—252)

This invention relates to improvements in dynamoelectric machines and, more particularly, to a ventilation arrangement for such a machine.

The invention is particularly applicable to enclosed dynamoelectric machines which embody a collector system comprising brushes together with either a commutator or slip rings. In a dynamoelectric machine employing such a collector system, located within the main machine housing, there is a problem of cooling the collector as well as the conductors leading thereto and at the same time assuring that carbon dust from the brushes will not be blown in upon the stator and rotor windings. It is an object of our invention to provide simple means for overcoming the above mentioned difficulty.

It is a further object of our invention to provide an improved construction which results in a generally more satisfactory operation of such a machine.

In general practice dynamoelectric machines are cooled by forcing air axially inward by means of an impeller located at each end of the machine. With the present invention the direction of flow is reversed at one end from the conventional direction so that air flows outward over the commutator. If this were to be done by an impeller located on the "out-board" side of the commutator end, so as to suck air out of the windings and then over the commutator, the impeller would interfere with normal maintenance of the machine which requires access to the commutator (when the machine is running) to observe commutation, eccentricity, roughness of commutator surface, or brush riding. We, therefore, provide a single impeller located at the opposite end of the machine and used to blow ventilating medium therethrough. In order to have an impeller at only one end of the machine furnish air flow of an amount substantially twice as great as that required of one of the two impellers conventionally used and located at each end of the machine, the means employed in the embodiment herein illustrated and described comprises a single centrifugal impeller located at the end opposite the commutator end of a commutator motor with a plurality of stationary cut-off and turning baffles so arranged that they scoop up air tangentially and radially discharged by the impeller and direct strong blasts of air axially to the parts of the machine to be cooled, so that air is forced first through the windings and then over the commutator. Other aspects of the invention will appear from consideration of the following description taken in connection with the accompanying drawing.

In the drawing, Fig. 1 is a side elevational view, mostly in section, of a commutator motor suitably embodying my invention and including a plurality of scoop and deflector arrangements 14, Fig. 2 is a cross-sectional end view taken on the line 2—2 of Fig. 1, and Fig. 3 is a detailed perspective view of a typical scoop and deflector arrangement 14.

In Fig. 1 an embodiment of our invention is shown in connection with a commutator motor of the totally enclosed type. The motor has an outer housing 1. An air cooler and filter device 1a is provided at the top of the machine but is not shown in detail. Outer housing 1 surrounds a substantial part of the stationary motor frame 2 which is provided with a plurality of salient field poles 3 having conventional field pole windings 4. In effect the spaces between adjacent field windings 4 form ventilating passages in said stator. The field poles are arranged to react electrodynamically with a rotatable portion contained within the frame and having a core portion 5 of magnetic material solidly attached to the shaft 6 of the machine and provided with axial cooling passages 7 and radially extending cooling passages 8. Rotor core 5 is also provided with slotted rotor windings 9 which are connected to the individual ears 10 of commutator segments 11. A brush rig 12 contacts said commutator. Thus far the arrangement is purely conventional.

A bladed ventilating medium impeller or fan 13 is arranged to be rotatable with shaft 2 at the end of the machine opposite the commutator end. Impeller 13 is of the centrifugal type so that, in operation, it draws ventilating medium in at its center, from the space provided by outer housing 1, and discharges it radially outward, imparting at the same time a strong tangential movement to the ventilating medium which is assumed to be air. Circumferentially arranged around the impeller is a stationary ring of cut-off and turning baffles which includes a plurality of scoop and deflector arrangements 14 described in more detail in connection with Figs. 2 and 3.

In Fig. 2 we have shown a cross sectional end view as viewed on the line 2—2 of Fig. 1. The cut-off and turning baffles, located in back of the field poles 3 and field windings 4 in Fig. 2, comprise a plurality of scoop and deflector arrangements 14 which are equal in number to (but circumferentially staggered with relationship to) the field poles. An inner convex surface of motor frame 2 forms a turning baffle 15 which defines a complete circle around the periphery of the impeller and which forms a quarter circle arc in the opposite plane to turn the air flow from a radially outward to an axial direction. Arcuate baffles 16 follow the contour of baffle 14 but extend circumferentially only a relatively short distance being used to hold together the parts of the individual scoop and deflector arrangements 14.

Located substantially midway across the air flow within the arc of turning baffle 15, and also forming a complete circle in the one direction and substantially a 90 degree arc in the other, is a turning baffle 17 which acts as a splitter baffle since it splits the air flow imparting to a portion of the air not only an axial but a radially inward motion so that it reaches the rotor cooling passages 7.

Scoop and deflector arrangements 14 include axially extending scoop baffles 18 and 19 which are curved, from a direction tangential to the periphery of the impeller, through a 90 degree arc to a direction which is substantially radial, to direct tangential air flow from the impeller radially outward into the turning vanes. The scoop and deflector arrangements also include bottom baffle 20 arranged tangential to the impeller rotation to prevent turbulence by sealing up the unused bottom portions of the scoop baffles 18 and 19.

Fig. 3 is a detailed perspective view of a portion of the cut-off and turning baffles including the turning surface 15 of the motor frame 2; the configured turning surface 16 holding together one of the six scoop and deflector arrangements 14, the turning vane 17 which is located substantially midway in the air stream to act as a splitter baffle, the scoops 18 and 19 and the bottom baffle 20 all arranged about the outer periphery of impeller 13.

When the impeller is in operation, turning vanes 15 and 17 direct the air primarily into the spaces surrounding the field windings 4 and into the rotor passages 7 as shown in Fig. 1 by the small arrows used to represent the direction of air flow. As already described the individual arrangements 14 are circumferentially staggered with relationship to the field poles 3 so that air directed to the field coil windings is concentrated at points midway between these windings. Cut-off baffles 18 are used to scoop air out of the impeller with a direction of impeller rotation as shown by the bottom arrow of Fig. 3. Cut-off baffles 19 are useful when rotation of the impeller is in the opposite direction. Bottom baffle 20 serves to prevent turbulence and consequent loss of a pressure by preventing air flow to the dead space between cut-off baffles 18 and 19. Meanwhile a parallel path is provided from the impeller into the axial rotor slots 7 and from there around the commutator ears 10 and their connecting conductors to a chamber at the commutator end of the machine. Additional parallel paths are provided from the axial passages 7 in the rotor to the radial rotor ducts 8 which, when the armature is rotating, create a suction which aids in pulling the air up through the ducts and into the air gap. Thus the air is forced through the body of the motor and finally across and around the collector system and then into the filter device 1a. Since the air reaches the commutator end last, any carbon dust picked up from contact with commutator 11 and the brushes of brush-rig 12 is blown away from the windings of the motor and entrapped in the filter. The filter may be made of glass wool or any other conventional material and should, of course, be replaced or cleaned at periodic intervals.

There is thus provided a device of the character described capable of accomplishing the objects hereinabove set forth, since, with our invention, the windings of the machine are kept clean because they are not exposed to brush and commutator dust and, therefore, frequent cleaning and repairs are not necessary.

Maximum pressures are obtained when the impeller is of the centrifugal type having its blades so designed that they discharge air radially outward, but then the flow of air discharged by the impeller is in a direction at right angles to the desired direction of flow axially inward toward the center of the machine. To turn the air flow from the one direction to the other by conventional means would result in a reduction of cooling efficiency. It is well known that one of the principal limiting features in the capacity and size of a dynamoelectric machine is the necessity of keeping within definite temperature rise limitations. With the present invention we use the cut-off and turning baffles described to provide a minimum loss of pressure in changing the direction of the flow while at the same time providing a strong concentration of air flow at the points where it is most needed such as midway between the pole pieces, so that heat is readily dissipated without a material increase in size or weight of the machine and substantial savings can be obtained due to the higher rating which may be given to the same size motor.

While we have illustrated and described a particular embodiment of our invention, modifications thereof will occur to those skilled in the art. We desire it to be understood, therefore, that our invention is not to be limited to the particular arrangement disclosed and we intend in the appended claims to cover all modifications which do not depart from the spirit and scope of our invention.

What we claim as new and desire to secure by Letters Patent of the United States is:

1. In a dynamoelectric machine, a stator portion having cooling passages, a rotor portion having cooling passages, a collector system at one end of said machine, a centrifugal cooling medium impeller rotatable with said rotor portion and located at the end of said machine opposite said collector system, and means including a ring of stationary cut-off baffles and associated turning baffles for directing cooling medium discharged by said centrifugal impeller axially inward through said stator and rotor portion and thereafter to said collector system.

2. In an enclosed dynamoelectric machine, a stator, a rotor, a collector system including brushes of carbonaceous material located at one end of said machine, a single centrifugal impeller located at the opposite end of said machine, means including turning baffles arranged as complete circles about the periphery of said impeller for turning ventilating medium discharged radially outward by said impeller to a direction substantially radially inward, means including a plurality of scoop baffles axially extending around the periphery of said impeller for turning ventilating medium discharged tangentially by said impeller to a direction substantially radially outward, and means including a filter for cleansing the ventilating medium of impurities picked up from contact with said collector system.

3. In a dynamoelectric machine, a stator portion having salient field poles, a rotor portion having ventilating passages, a collector system including brushes, a centrifugal ventilating medium impeller rotatable with said rotor portion and located at the end of said machine opposite said collector system, a stationary ring shape turning baffle arranged about the periphery of said impeller and in another plane defining an arc of substantially 90 degrees adapted to turn the direction of flow of ventilating medium discharged by said impeller from a radially outward direction to a direction substantially axially inward, a second stationary ring shape turning baffle located within said first mentioned turning baffle and also defining an arc of substantially 90 degrees so as to act as a splitter baffle, a plurality of scoop and deflector arrangements located within said first mentioned turning baffle and adjacent the periphery of said impeller, said arrangements being equal in number to said salient field poles but arranged in circumferentially staggered relationship thereto to direct ventilating medium therebetween, each of said arrangements comprising at least one baffle arranged as a scoop axially extending the width of said arrangement and forming a substantially 90 degree arc in another direction to change the direction of ventilating medium flow from tangential to radially outward with respect to said impeller, and a bottom baffle arranged for a short distance about the periphery of said impeller on the inactive side of said scoop baffle for preventing turbulence thereat.

4. In an enclosed dynamoelectric machine, a stator portion having salient field poles, a rotor portion having ventilating passages, a collector system including brushes located at one end of said machine, a centrifugal bladed ventilating medium impeller rotatable with said rotor portion and located at the end of said machine opposite said collector system, a stationary ring shape turning surface arranged about the periphery of said impeller and arcuately shaped from radially outward to axially inward with respect to the axis of said machine, a second ring shape turning surface located substantially midway in the radius of the arc of said first mentioned turning surface and likewise arcuately shaped from radially outward to axially inward with respect to the axis of said machine, a plurality of axially extending scoop baffles arranged about the periphery of said impeller equal in number to said field poles but circumferentially staggered with respect thereto, said scoops being arcuately shaped from tangential to said impeller to a radially outward direction and adapted to scoop ventilating medium from said impeller with one direction of rotation of said impeller, a like number of oppositely disposed but otherwise similar scoop baffles adapted to scoop ventilating medium from said impeller with an opposite direction of impeller rotation, means including additional baffles for holding said scoop baffles in place, and means including a filter for filtering foreign matter out of the ventilating medium supplied to said impeller.

THOMAS M. LINVILLE.
KENTON D. McMAHAN.

REFERENCES CITED

The following references are of record in the file of this patent:

UNITED STATES PATENTS

| Number | Name | Date |
|---|---|---|
| 923,673 | Lord | June 1, 1909 |
| 953,574 | Amsler | Mar. 29, 1910 |
| 1,121,014 | Hobart | Dec. 15, 1914 |
| 1,476,776 | Stamm | Dec. 11, 1923 |
| 1,628,086 | Warner | May 10, 1927 |
| 1,835,248 | Suter | Dec. 8, 1931 |

FOREIGN PATENTS

| Number | Country | Date |
|---|---|---|
| 503,070 | France | Mar. 8, 1920 |
| 530,668 | France | Oct. 7, 1921 |